No. 663,394. Patented Dec. 4, 1900.
C. G. READ.
DISH WASHING MACHINE.
(Application filed Apr. 25, 1900.)

(No Model.) 2 Sheets—Sheet 1.

Witnesses

Inventor
Charles G. Read.
By Knight Bros
Attorneys

No. 663,394. Patented Dec. 4, 1900.
C. G. READ.
DISH WASHING MACHINE.
(Application filed Apr. 25, 1900.)
(No Model.) 2 Sheets—Sheet 2.
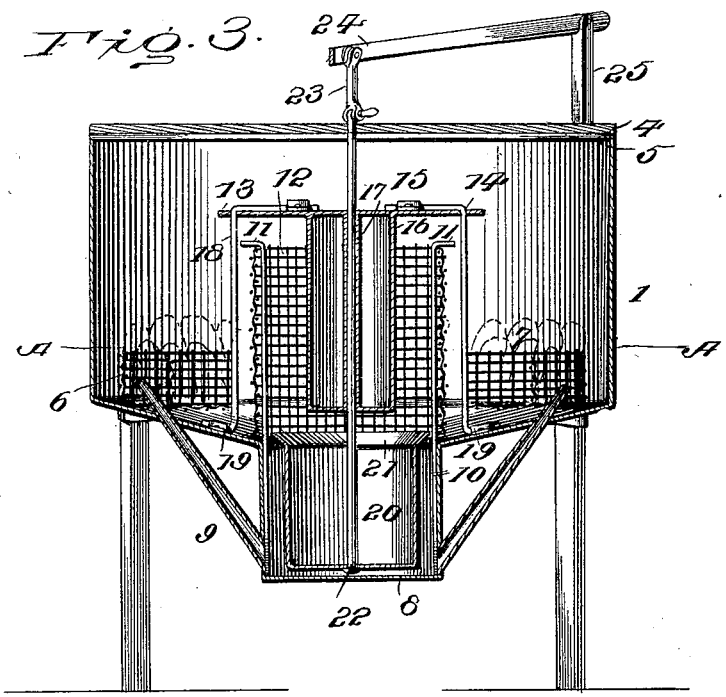
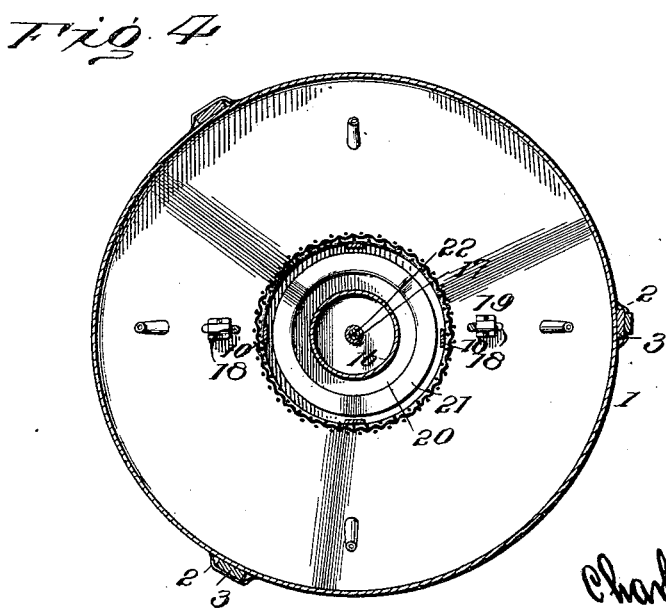
Witnesses
Inventor
Charles G. Read.
By Knight Bros.
Attorneys

UNITED STATES PATENT OFFICE.

CHARLES G. READ, OF EDEN, NEW YORK, ASSIGNOR OF ONE-HALF TO JAMES D. READ, OF SAME PLACE.

DISH-WASHING MACHINE.

SPECIFICATION forming part of Letters Patent No. 663,394, dated December 4, 1900.

Application filed April 25, 1900. Serial No. 14,333. (No model.)

*To all whom it may concern:*

Be it known that I, CHARLES G. READ, a citizen of the United States, and a resident of Eden, in the county of Erie, State of New York, have invented certain new and useful Improvements in Dish-Washing Machines, of which the following is a specification.

My invention relates to dish-washing machines, and has for its object to produce a machine of this character cheap of manufacture, simple, and effective.

My invention consists of a dish-receptacle, a depending water-reservoir connected to said receptacle by means of spouts extending from the bottom of the reservoir, a dish-holding rack in said receptacle, and a perforated partition surmounting the reservoir.

My invention consists, further, of a cylinder mounted in the dish-receptacle immediately over the water-reservoir, said cylinder being of less diameter than said reservoir; and it consists, further, of a dash-cup having an outwardly-flared upper rim mounted on a rod which passes through the cylinder above mentioned and is connected to an operating lever or arm; and my invention consists, further, of the parts and the combination of parts, as will be hereinafter more fully set out.

Figure 1:
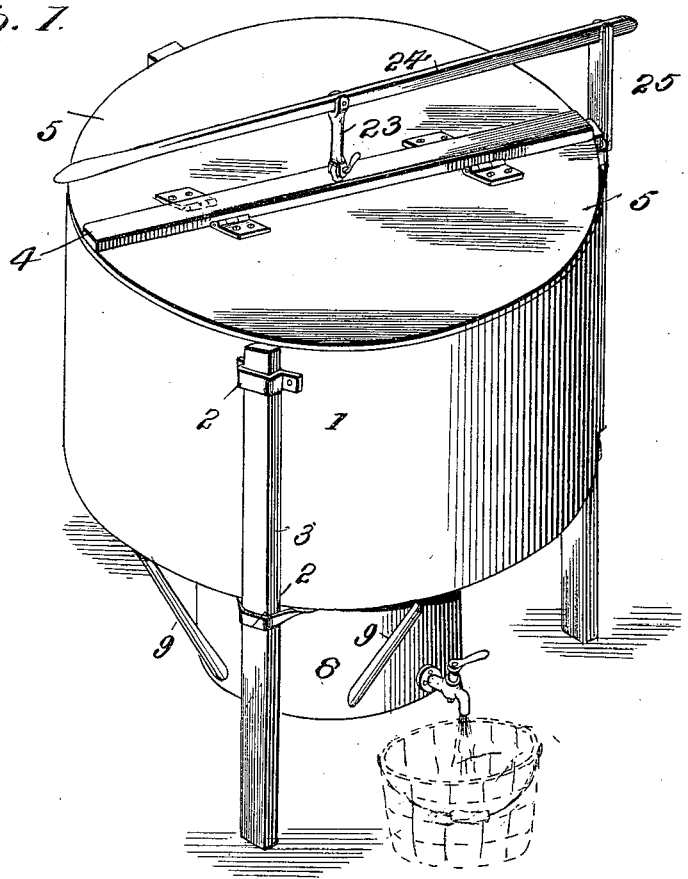
Figure 2:
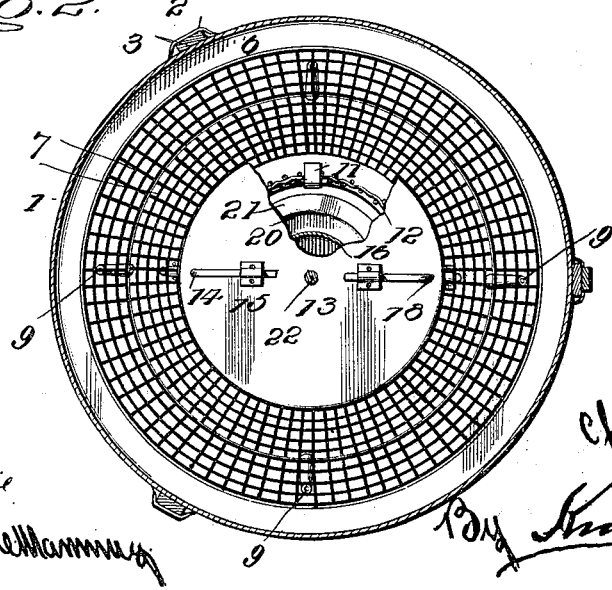

In the drawings, Figure 1 is a perspective view of a dish-washing machine embodying my invention. Fig. 2 is a horizontal section of the same. Fig. 3 is a vertical central section of the same; and Fig. 4 is a section on the line A A, Fig. 3.

1 represents the dish-holding receptacle, provided with the straps 2, by means of which supporting-legs 3 are secured to the same.

4 is a central strip adapted to be secured to the top of the dish-receptacle in a suitable manner, and 5 represents wings hinged respectively to each side of the strip 4 and forming a cover for said receptacle.

6 is a partition secured within the dish-receptacle, from which a base 7 extends in a horizontal plane, said partition and base being of wire-netting or suitable material perforated.

8 is a water-reservoir secured to and depending centrally from the bottom of the receptacle 1, the bottom of said receptacle sloping from its periphery toward the top of the reservoir 8.

9 represents spouts leading from the bottom of the reservoir 8 upward through the bottom of the dish-receptacle and extending upward into said receptacle at an angle. As shown in the drawings, there are four of these spouts connecting the reservoir and dish-receptacle; but it is obvious, of course, that I may employ more or less, if desired.

10 represents combined supporting and guiding rods extending from the bottom of the reservoir 8 upward into the dish-holding receptacle 1, the upper ends of said rods being bent outward, as at 11.

12 is a wire-cloth partition secured to the bottom of the dish-receptacle immediately around the top of the water-reservoir and extending upward the height of the guiding-rods 10 and secured under the outwardly-bent ends 11 thereof.

13 is a disk provided with perforations 14 and clamping loops or straps 15. 16 is a splasher integral with and depending from said disk and provided with a centrally-bored solid portion 17, said splasher extending to a point a short distance above the top of the reservoir 8.

18 represents supporting-rods passing through perforations 14 in the disk, one end of each of which is secured to said disk 13 by means of the straps 15, the lower ends of the supporting-rods 18 being secured to the bottom of the dish-receptacle by means of the strap 19, all of which is clearly shown in Fig. 3.

20 is a dash-cup of diameter less than the reservoir 8, said cup being adapted to reciprocate in said reservoir and opening at its upper end and provided with an outwardly-flaring rim 21. 22 is a rod rigidly secured to said cup and extending therefrom through the centrally-bored portion 17 of the splasher 16 and through a suitable opening in the central piece 4 of the covering, above which it is secured to a link 23, pivoted to an operating arm or lever 24, which in turn is pivoted to a suitable standard 25, secured to one side of the receptacle 1.

The operation of the machine is as follows: Water is poured into the reservoir 8, and the dishes being suitably arranged within the receptacle 1, against the partition 6 and on the floor 7, the operating-lever 24 is rapidly reciprocated, and on its upward movement the rod 22 is drawn upward, thereby elevating the cup 20 until the end of the splasher 16 is in the bottom of said cup. The cup is then lowered into the reservoir, thereby forcing the water from said reservoir through the spouts 9 into the dish-receptacle against the dishes, the flared top or rim of the cup splashing the water from the top of the reservoir over the dishes in addition to the water from the spouts. At this point a certain amount of water in addition to that contained therein runs into the cup 20, and as soon as the cup is elevated forcibly the splasher 16 upon entering said cup splashes the water therefrom over the dishes. Thus it will be seen that the dishes receive a douche of water at each end of the stroke of the operating-lever. From Fig. 3 it will be seen that the disk 13 extends beyond the periphery of the cup 20, thereby preventing the water expelled from said cup passing higher than said disk, and, further, the disk acts as a spreader for the water splashed from said cup, as will be readily understood. It will be seen that by reason of the sloping bottom of the receptacle 1 all water is drained back into the reservoir. The rods 10 serve as guides for the cup-shaped plunger 20 in its vertical movement.

What I claim, and desire to secure by Letters Patent, is—

1. In a dish-washing machine, the combination with a dish-receptacle, of a reservoir opening through and depending from the bottom thereof, spouts connecting said reservoir and receptacle and a plunger having an outwardly-flared upper end, and a splasher adapted to enter said plunger and means to reciprocate the first-named plunger.

2. In a dish-washer, the combination with the dish-receptacle, a reservoir opening into and depending from the same of a cup-shaped plunger having an outwardly-flared splashing-rim secured to its upper end, and a stationary splasher secured within the receptacle above and in line with the cup-shaped plunger, said splasher adapted to enter the cup-shaped plunger as the latter is reciprocated and expelling therefrom water.

3. In a dish-washing machine, the combination with the dish-receptacle, a reservoir opening into and depending from the same, of a disk secured within the receptacle above the reservoir, a splasher depending therefrom and a cup-shaped plunger adapted to coöperate with said splasher.

4. In a dish-washing machine, the combination with the receptacle, of a reservoir opening into and depending therefrom, a disk secured within the receptacle above and of greater diameter than the reservoir, a splasher depending from said disk and provided with a centrally-bored portion and a cup-shaped plunger having an upwardly-flared end mounted upon a rod passing through the bored portion of the said splasher, said rod being connected to an operating-lever.

5. In a dish-washer the combination with the dish-receptacle, a reservoir opening into and depending therefrom spouts connecting the bottom of the reservoir with said receptacle, guide-rods extending from the reservoir into the receptacle and bent outwardly at their upper ends, of a disk mounted upon suitable standards within said receptacle a splasher depending from said disk and having a centrally solid bored portion, a rod mounted therein, of a cup-shaped plunger having an outwardly-flared upper end and secured to said rod, and an operating-lever also secured to said rod.

CHARLES G. READ.

Witnesses:
D. A. PALMERTON,
J. D. READ.